(12) United States Patent
Iwasaki et al.

(10) Patent No.: US 6,718,939 B2
(45) Date of Patent: Apr. 13, 2004

(54) ENGINE CYLINDER INDUCTION AIR QUANTITY MEASUREMENT

(75) Inventors: Tetsuya Iwasaki, Tokyo (JP); Shouichi Hayase, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 10/342,340

(22) Filed: Jan. 15, 2003

(65) Prior Publication Data

US 2003/0164152 A1 Sep. 4, 2003

(30) Foreign Application Priority Data

Jan. 18, 2002 (JP) ......................................... 2002-010666

(51) Int. Cl.[7] .................................................. F01L 1/34
(52) U.S. Cl. ..................... 123/319; 123/348; 123/90.11; 123/90.16; 123/347
(58) Field of Search ................................. 123/319, 348, 123/90.11, 90.1, 347, 402

(56) References Cited

U.S. PATENT DOCUMENTS 6,328,007 B1   12/2001   Hirasawa et al.

FOREIGN PATENT DOCUMENTS

JP    2001-50091 A    2/2001

OTHER PUBLICATIONS

U.S. patent application Ser. No. 10/342,339, Iwasaki et al., filed Jan. 15, 2003.

*Primary Examiner*—Bibhu Mohanty
(74) *Attorney, Agent, or Firm*—Foley & Lardner

(57) ABSTRACT

An engine cylinder induction air quantity measuring apparatus includes a controller to calculate an intake manifold inside air quantity of air in an intake manifold, from a sensed intake air quantity by performing a balance calculation to calculate a balance between an intake manifold inflow air quantity, and an intake manifold outflow air quantity; and to calculate a cylinder induction air quantity in accordance with the intake manifold inside air quantity. The controller is configured to determine whether an engine stop position of the engine is within the valve overlap period; and to set the intake manifold inside air quantity equal to an overlap stop mode final air quantity for use as an initial value of the intake manifold inside air quantity in a next start of the engine when the engine stop position is within the valve overlap period.

15 Claims, 8 Drawing Sheets

ENGINE CYLINDER INDUCTION AIR QUANTITY MEASUREMENT

BACKGROUND OF THE INVENTION

The present invention relates to technique of measuring a quantity of air inducted into a cylinder section of an engine in accordance with a quantity of air inside an intake manifold determined by a balance calculation between an inflowing air quantity and an outflowing air quantity. In particular, the present invention relates to such engine cylinder induction air quantity measurement adapted to an engine provided with a valve overlap.

U.S. Pat. No. 6,328,007B1 (corresponding to Published Japanese Patent application Kokai No. 2001-50091) shows a process of balance calculation between the inflowing and outflowing air quantities to determine an intake manifold inside air quantity, and to calculate an engine cylinder induction air quantity in accordance with the manifold inside air quantity and a cylinder volume.

SUMMARY OF THE INVENTION

The balance calculation process is not sufficiently adequate when an engine is stopped at a crank position within a valve overlap since air is drawn into the intake manifold from the exhaust system.

It is an object of the present invention to provide apparatus and/or method of measuring an engine cylinder induction air quantity more accurately even if an engine is stopped at a position within the valve overlap.

According to the present invention, an engine cylinder induction air quantity measuring apparatus for an engine provided with a valve overlap period during which an intake valve and an exhaust valve both open, comprises: an intake air quantity sensing section to sense an intake air quantity of air drawn into an intake system of the engine; an intake manifold inside air quantity calculating section to calculate an intake manifold inside air quantity of air in an intake manifold of the engine, from the intake air quantity by performing a balance calculation to calculate a balance between an intake manifold inflow air quantity of air flowing into the intake manifold, and an intake manifold outflow air quantity of air flowing out of the intake manifold; a cylinder induction air quantity calculating section to calculate a cylinder induction air quantity of air inducted into a cylinder section of the engine in accordance with the intake manifold inside air quantity; an engine stop position determining section to detect an engine stop of the engine, and to determine whether an engine stop position of the engine is within the valve overlap period; and a manifold inside air quantity modifying section to set the intake manifold inside air quantity equal to an overlap stop mode final air quantity and thereby to cause the intake manifold air quantity calculating section to use the overlap stop mode final air quantity as an initial value of the intake manifold inside air quantity in a next start of the engine when the engine stop position is within the valve overlap period.

According to the present invention, an engine cylinder induction air quantity measuring process comprises: calculating an intake manifold inside air quantity, from a sensed intake air quantity of an engine, by performing a balance calculation to calculate a balance between an intake manifold inflow air quantity, and an intake manifold outflow air quantity, and calculating a cylinder induction air quantity from the intake manifold inside air quantity; determining whether an engine stop position of the engine is within a valve overlap period; and modifying the manifold inside air quantity, by setting the manifold inside air quantity equal to an overlap stop mode final air quantity when the engine stop position is within the valve overlap period.

The other objects and features of this invention will become understood from the following description with reference to the accompanying drawings.

DETAILED DESCRIPTION OF THE INVENTION

Figure 1:
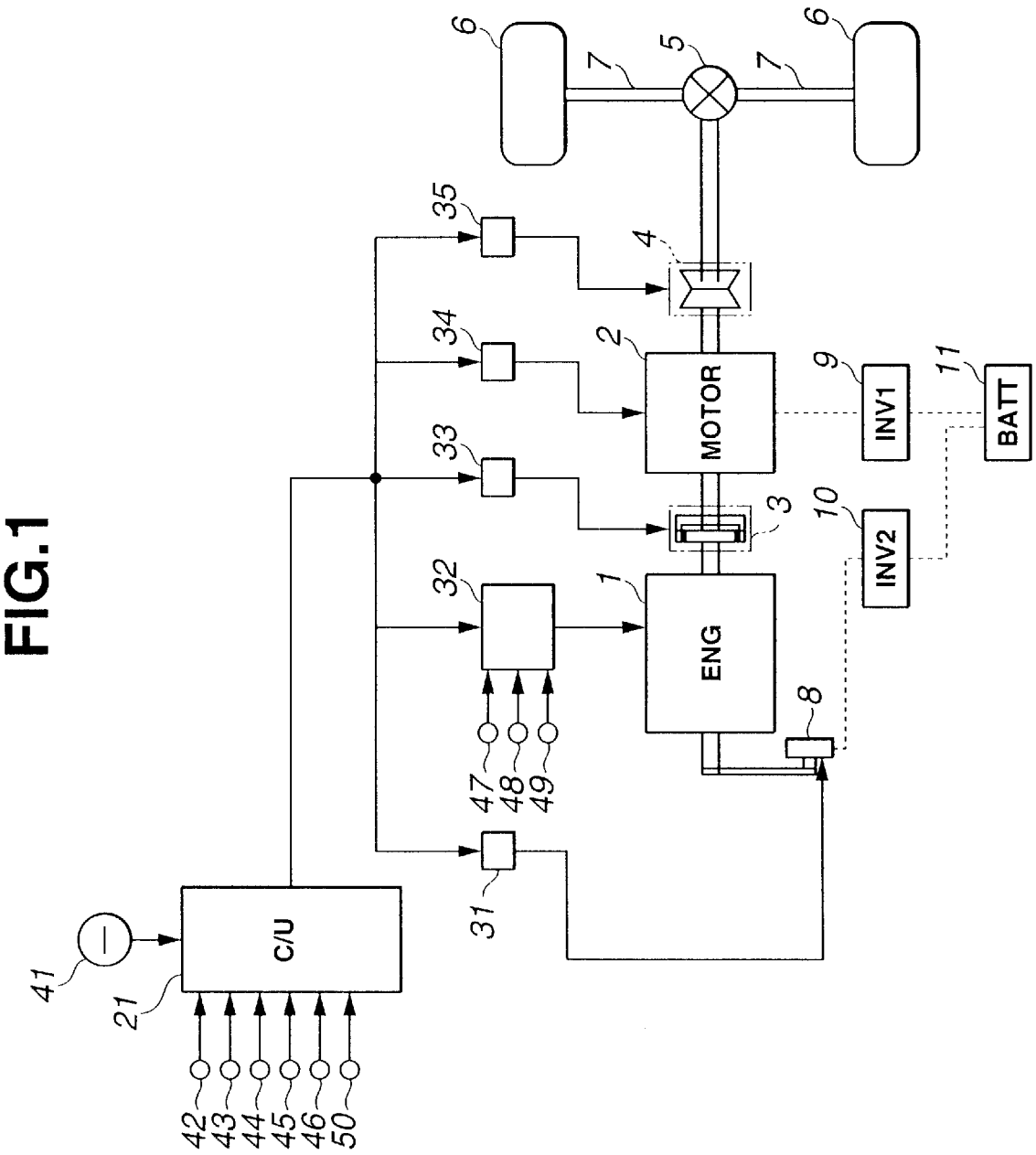
FIG. 1 is a schematic view showing a vehicle control system according to one embodiment of the present invention.

FIG. 1 shows a vehicle control system according to one embodiment of the present invention. A power system of this example is a parallel hybrid system including an engine 1 and a first (traction) electric motor (or motor/generator) 2.

In the power system, the crank shaft of engine 1 is connected with the rotation shaft of first motor 2 through a powder clutch 3. Torque produced by this power unit is transmitted through a transmission 4 and a differential gear unit 5 to left and right drive shafts 7 for left and right drive wheels 6. By engaging and disengaging powder clutch 3, this hybrid system can drive the vehicle only by motor/generator 2, or only by engine 1, or by engine 1 with the supplementary aid of motor/generator 2.

The rotation shaft of a second (cranking) electric motor (or motor/generator) 8 distinct from first motor/generator 2 is connected with the crank shaft of engine 1. Second motor/generator 8 is used for cranking of engine 1 and regenerative power generation. First motor/generator 2 too is capable of regenerating energy. Electric power generated by motor/generators 2 and 8 is stored to a battery 11 (BATT) through respective inverters 9 and 10 (INV1 and INV2). Conversely, power is supplied from battery 11 through inverters 9 and 10 to motor/generators 2 and 8.

The control system of FIG. 1 includes a controller section having a plurality of controllers. A vehicle control unit (or electronic control unit ECU) 21 serves as an upper-level (or superordinate) controller for issuing commands to lower-level controllers of subsystems, and thereby attending to the overall control of the vehicle. In this example, commands are produced in terms of torque because of its universality. Vehicle ECU 21 delivers a motor torque command to a motor controller 31 for controlling motor/generator 8; an engine torque command to an engine controller 32 for controlling engine 1; a clutch transmission torque command to a clutch controller 33 for controlling clutch 3; a motor torque command to a motor controller 34 for controlling traction motor/generator 2; and a transmission torque command (speed ratio command) to a transmission controller 35 for controlling transmission 4. Each of controllers 31~35 controls its controlled system in accordance with the torque command sent from vehicle ECU 21.

A sensor (or input) section of the control system of this example includes the following input devices. A start switch 41 produces an on-off signal representing the on-off state of an ignition switch of the vehicle, and an on signal of a start switch of the vehicle. An accelerator sensor 42 senses a driver's accelerator input or accelerator pedal depression, and produces an accelerator position signal representing a driver's demand. A brake sensor 43 senses a brake pedal depression or a turn-on of a brake switch. A shift sensor 44 senses a current position of a shift lever. Signals from these sensors are supplied to vehicle ECU 21.

Vehicle ECU 21 is supplied with information on various operating conditions from the following sensors: A vehicle speed sensor 45 senses a vehicle speed VSP. A battery sensor 46 senses a state of charge (SOC) of battery 11 (by sensing a discharge current, in this example). A motor speed sensor 50 senses a rotational speed (rpm) NM of second motor/generator 8. These sensors 45, 46 and 50 are connected with vehicle ECU 21. Engine controller 32 is supplied with information on operating conditions from the following sensors. A throttle sensor 47 senses a throttle opening (degree) TVO of engine 1. An air flow meter (or air flow sensor) 48 senses an intake air quantity Qa of engine 1. (The intake air quantity Qa sensed by air flow sensor 48 is also referred to as a throttle passage air quantity, for discrimination from a later-mentioned cylinder induction air quantity.) A crank angle sensor 49 senses the crank angle of engine 1. These sensors 47, 48 and 49 are connected to engine controller 32.

In accordance with input information from various sensors, vehicle ECU 21 calculates torques as commands. If the SOC of battery 11 is at a sufficient level, vehicle ECU 21 employs traction motor/generator 2 as prime mover in a low vehicle speed operation, disengages clutch 3 and stops engine 1. When vehicle speed VSP is increased into a predetermined high speed region according to a driver's acceleration demand, then vehicle ECU 21 shifts the power source to engine 1 by starting engine 1 and engaging clutch 3.

During operation of engine 1, engine controller 32 always ascertains a cylinder induction air quantity of air inducted into the engine cylinder, and calculates a fuel supply quantity (a fuel injection quantity in this example) required to achieve the engine torque dictated by the command, with respect to the cylinder induction air quantity. The cylinder induction air quantity and fuel injection quantity are calculated in the following manner.

Figure 2:
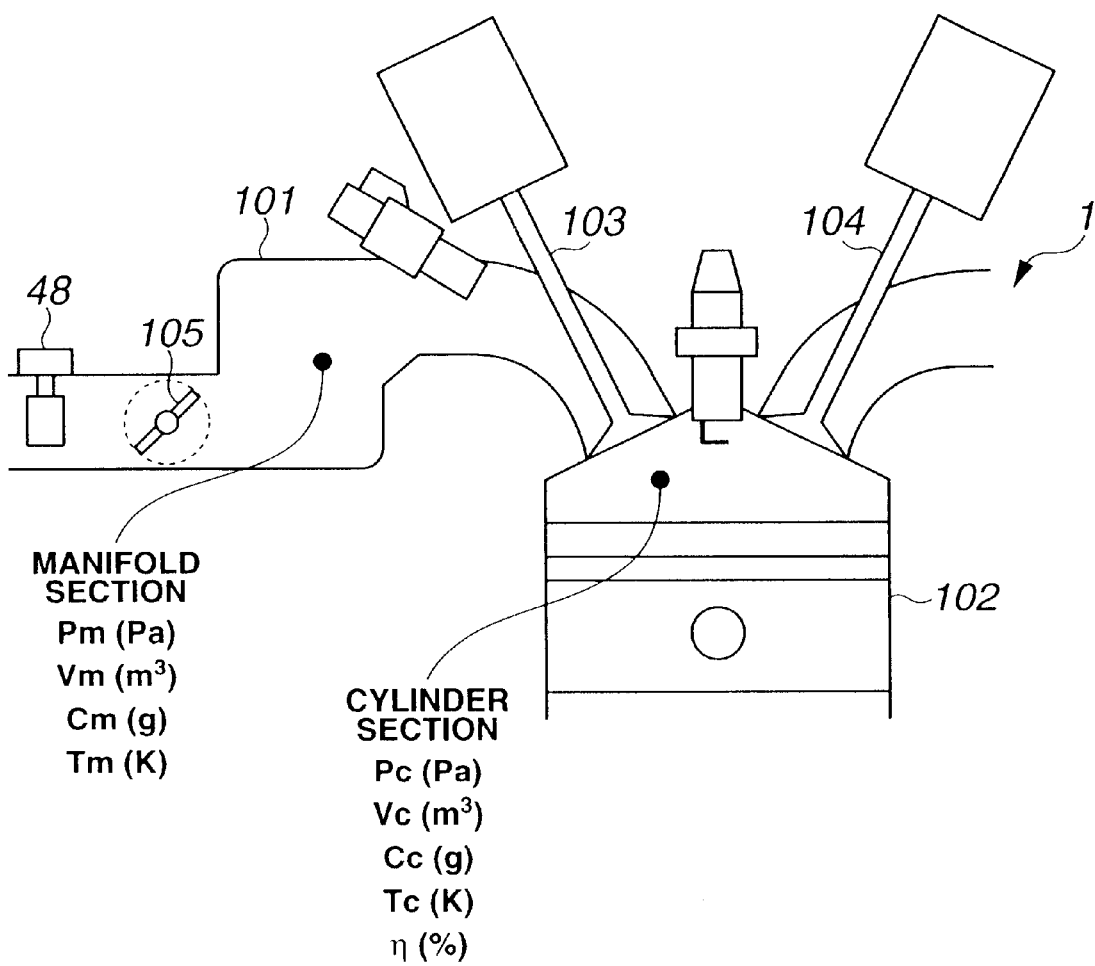
FIG. 2 is a schematic view showing an intake manifold and a cylinder of an engine in the system of FIG. 1, with parameters used for calculating an engine cylinder induction air quantity.

In this example, the cylinder induction air quantity is calculated by a cylinder induction air quantity calculating method disclosed in the before-mentioned U.S. Pat. No. 6,328,007 B1. The disclosure of this U.S. Pat. No. 6,328,007 B1 about the calculating method, including FIGS. 1A, 4, 5, 6 and 7 and the related explanations, is herein incorporated by reference. In an intake manifold 101, as shown in FIG. 2, a pressure is Pm [Pa], a volume is Vm [m³, constant], an air mass quantity (the mass of air) is Cm [g], and a temperature is Tm [K]. In an engine cylinder section 102, a pressure is Pc [Pa], a volume is Vc [m³], an air mass quantity (the mass of air) is Cc [g], and a temperature is Tc [K]. An incylinder fresh air rate is η[%]. This incylinder fresh air rate η is varied in correlation with a valve overlap period of an intake valve 103 and an exhaust valve 104. Incylinder fresh air rate η decreases as the valve overlap period elongates and hence the amount of residual burnt gases (internal EGR gases) increases. In this example, it is assumed that Pm=Pc, and Tm=Tc. Thus, the pressure and temperature remain unchanged between intake manifold 101 and engine cylinder section 102. Manifold volume Vm is constant.

First, engine controller 32 calculates the throttle passage air quantity Qa [g/msec] from the output of air flow meter 48. Throttle passage air quantity Qa is a a flow rate of air passing through throttle valve 105. Engine controller 32 further calculates a manifold inflow air quantity Qa (the mass (g)) of air flowing into intake manifold 101 during each predetermined time period Δt by integration of throttle passage air quantity Qa. In this example; Qa [g]=Qa·Δt.

On the other hand, engine controller 32 calculates an actual cylinder volume Vc at an intake valve closing timing, in accordance with the closing timing IVC of intake valve 103, and multiplies the actual cylinder volume Vc by incylinder fresh air rate η, and engine speed NE (determined by motor speed NM of motor/generator 8). Then, by integrating the result of this calculation, engine controller 32 determines a final cylinder volume Vc=Vc·η·NE·Δt.

Then, for a manifold inside air balance calculation, engine controller 32 calculates a current manifold inside air quantity $Cm_n$ from a previous manifold inside air quantity $Cm_{n-1}$ which is a previous value of the manifold inside air quantity Cm, by addition of the manifold inflow air quantity Qa determined in the above-mentioned process, and subtraction of a manifold outflow air quantity $Cc_n$ which is a cylinder induction air quantity Qc of air flowing out of manifold 101 into cylinder section 102. In this calculation, engine controller 32 uses, as $Cc_n$, a previous value calculated in a previous execution of this routine. That is;

$$Cm_n = Cm_{n-1} + Qa - Cc_n \quad (1)$$

Cylinder induction air quantity Qc (=incylinder air quantity Cc) is calculated from a cylinder volume Vc, by multiplication by manifold inside air quantity Cm and division by manifold volume Vm. That is;

$$Qc(=Cc) = Vc \cdot Cm/Vm \quad (2)$$

This equation (2) is obtained as follows. Rearrangement of an equation of state of gas P·V=C·R·T provides C=P·V/(R·T). Therefore, as to cylinder section 102; Cc=Pc·Vc/(R·Tc). Assuming Pc=Pm and Tc=Tm, $$Cc = Pm \cdot Vc/(R \cdot Tm) \quad (3)$$

On the other hand, rearrangement of the equation of state of gas P·V=C·R·T provides P/(R·T)=C/V. Therefore, as to intake manifold 101;

$$Pm/(R \cdot Tm) = Cm/Vm \quad (4)$$

Substitution of equation (4) into equation (3) yields;

$$Cc = Vc \cdot \{Pm/(R \cdot Tm)\} = Vc \cdot Cm/Vm$$

Thus, the equation (2) is obtained.

In this way, the control system according to this embodiment can determine the cylinder induction air quantity Qc. For the thus-determined cylinder section air quantity Qc, the control system sets a fuel injection quantity to achieve an optimum air-fuel ratio.

Engine 1 is stopped in the low vehicle speed region, as mentioned before. During an engine stopping operation for stopping engine 1, the balance calculation of manifold inside air quantity Cm is continued until the pressure in intake manifold 101 becomes equal to the atmospheric pressure, in order to use the manifold inside air quantity (final value) Cm calculated at the time when the pressure in intake manifold 101 becomes equal to the ambient pressure, as an initial value for calculating cylinder induction air quantity Qc for a next engine start.

Figure 3:
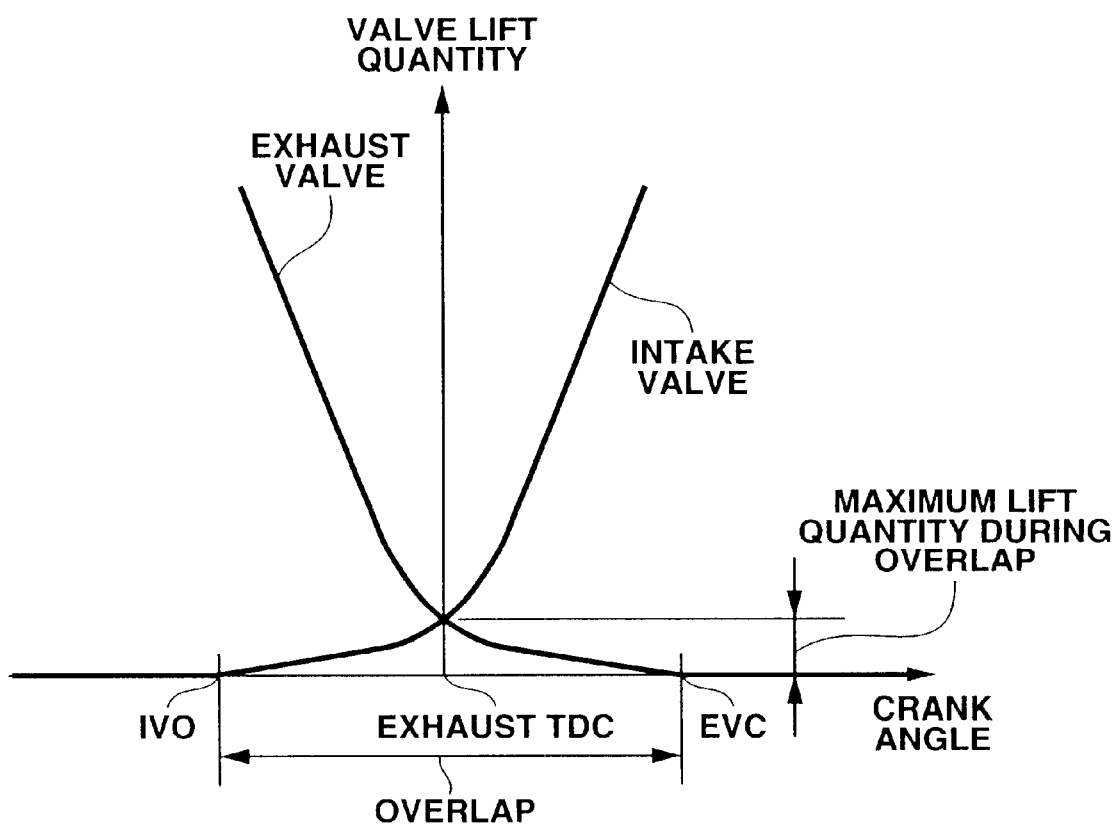
FIG. 3 is a graph for illustrating a valve overlap of the engine of FIG. 1.

The balance calculation of the manifold inside air quantity Cm during the engine stopping operation is performed in the following manner. As shown in FIG. 3, engine 1 of this embodiment is provided with a valve overlap (between the intake valve opening timing IVO and the exhaust valve closing timing EVC) during which intake valve 103 and exhaust valve 104 are both open in a TDC region around the exhaust top dead center.

Figure 4:
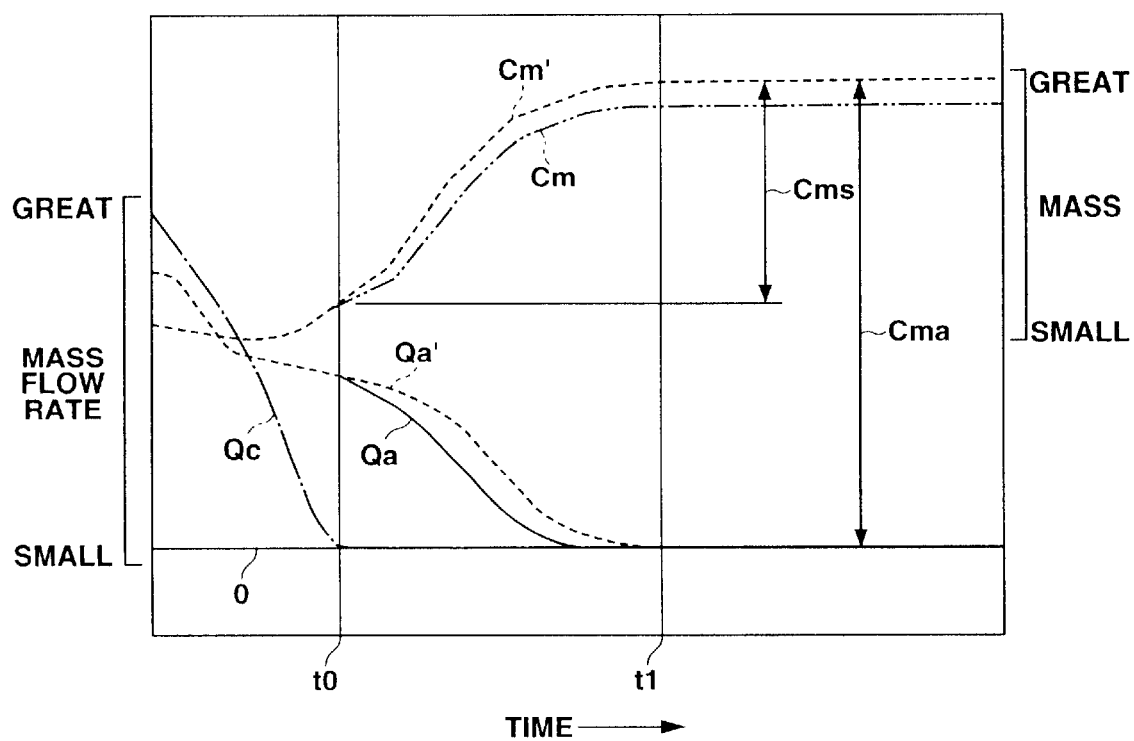
FIG. 4 is a graph showing influence on a manifold inflow air quantity Qa, a cylinder induction air quantity Qc and an intake manifold inside air quantity Cm, by gas flow into the intake side from the exhaust side during the valve overlap.

A stop position of engine 1 is determined by the balance between crank shaft torque in the forward direction and crank shaft torque in the reverse direction. Generally, a six-cylinder engine stops near a crank angle position of 60° before the top dead center on the compression stroke, and a four-cylinder engine stops near a crank angle position of 90° BTDC on the compression stroke. In some cases, however, engines may go through the standard stop position, and stop within the valve overlap period. In this case, air flows into intake manifold 101 from the exhaust system at the time of the balance calculation in the engine stopping operation. FIG. 4 shows time variation of manifold inflow air quantity Qa, cylinder induction air quantity Qc and manifold inside air quantity Cm in this situation.

When engine 1 stops within the overlap, air is drawn into intake manifold 101 from the exhaust side, too. Therefore, manifold inflow air quantity Qa calculated from the throttle passage air quantity (sensed by air flow meter 48) becomes smaller than an actual manifold inflow air quantity Qa' of air actually introduced into intake manifold 101. As a result, manifold inside air quantity Cm calculated from this manifold inflow air quantity Qa becomes smaller than an actual manifold inside air quantity Cm of air actually existing in intake manifold 101.

Figure 5:
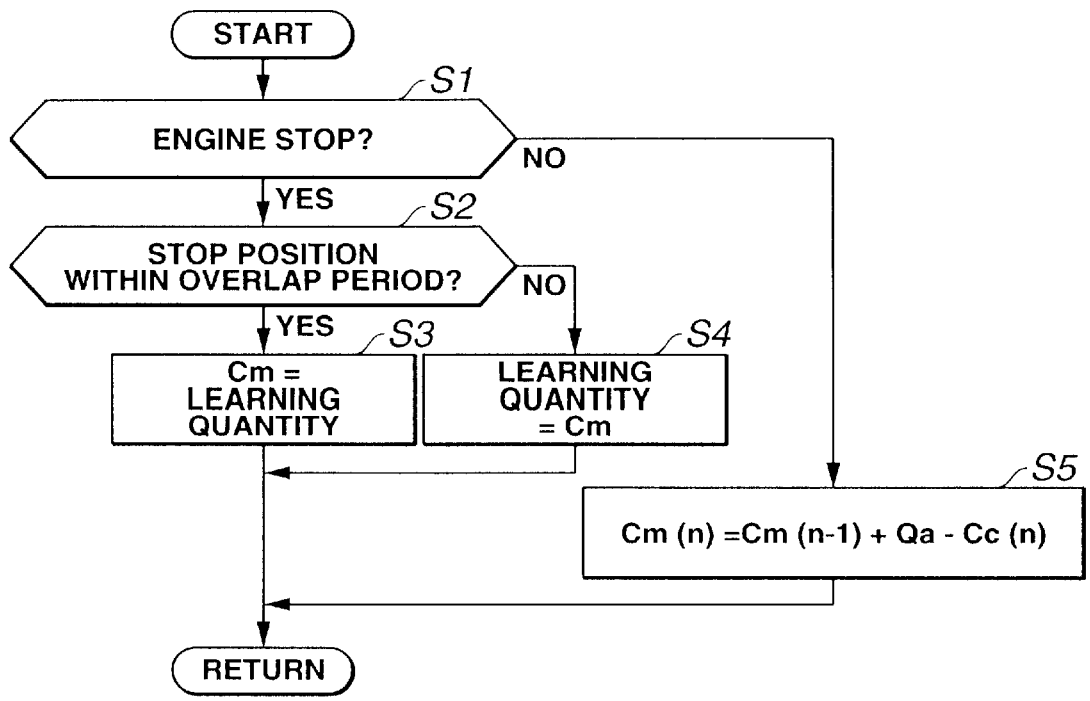
FIG. 5 is a flowchart showing an engine stopping process in one example of the embodiment.

FIG. 5 shows, in the form of a flowchart, an engine stopping control process according to this embodiment designed to meet the above-mention problem. The control process of FIG. 5 is executed by engine controller 32.

At S1 (step 1), engine controller 32 examines whether the engine is brought to a stop. In this example, engine controller 32 determines an engine stoppage by examining when the pressure in intake manifold 101 becomes equal to the atmospheric pressure. By employing a pressure sensor provided in a wall of intake manifold 101, engine controller can ascertain a stoppage of engine 1 by checking that the output of this pressure sensor (representing an intake manifold pressure PB) becomes unchanging (the intake pressure PB becomes substantially constant). Alternatively, it is possible to detect a stoppage of engine 1 by checking that the throttle passage air quantity becomes equal to zero, or that the manifold inside air quantity Cm calculated by the balance calculation becomes unchanging. Engine controller 32 proceeds from S1 to S2 when engine 1 is brought to a stop, and to S5 when it is judged that engine 1 is not brought to a stop.

Figure 7:
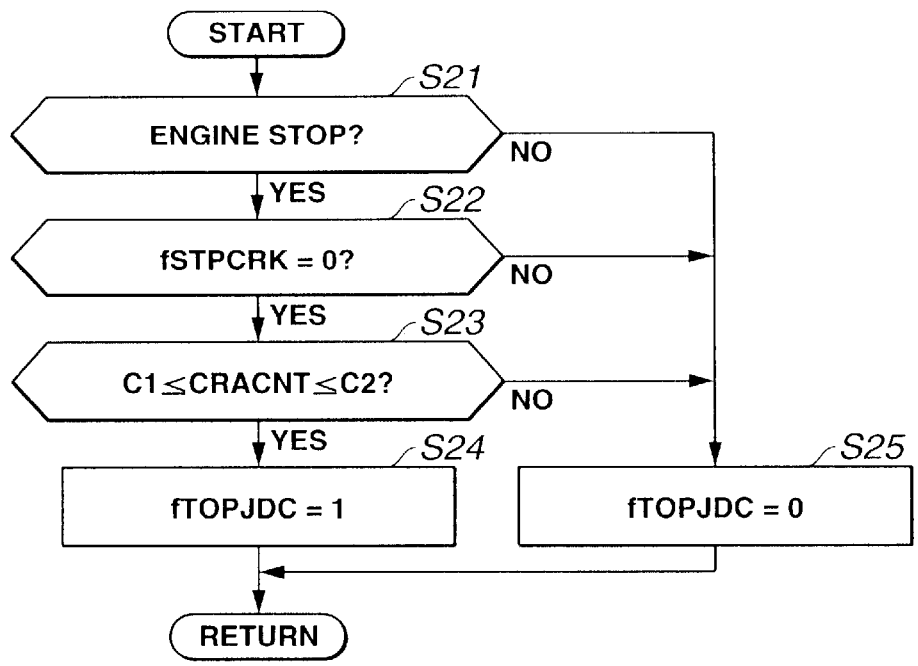
FIG. 7 is a flowchart showing a process of examining an engine stop position in the embodiment.

At S2, engine controller 32 examines whether a stop position of engine 1 is within the valve overlap period, or not (, by examining whether an overlap stop flag fTOPJDC mentioned later with reference to FIG. 7 is set equal to one). From S2, engine controller 32 proceeds to S3 when the engine stop position is within the overlap period, and to S4 otherwise.

At S3, engine controller 32 substitutes a value of a learning control variable (Cm) calculated by the engine stopping process when engine 1 has stopped outside the overlap period before, into the manifold air quantity Cm to be set as the final value of the engine stopping process, and stores the thus-obtained value Cm. The quantity Cm substituted in this case is the quantity stored before by the operation of S4.

At S4, engine controller 32 stores, as the learning control quantity, the manifold inside air quantity Cm (final value) calculated as a result of continuation of the balance calculation based on the output of air flow meter 48 until the pressure in intake manifold 101 becomes equal to the atmospheric pressure.

If, on the other hand, engine 1 is still running (the pressure in intake manifold 101 is not equal to the atmospheric pressure), then engine controller 32 calculates manifold inside air quantity Cm by the balance calculation at S5.

Figure 6:
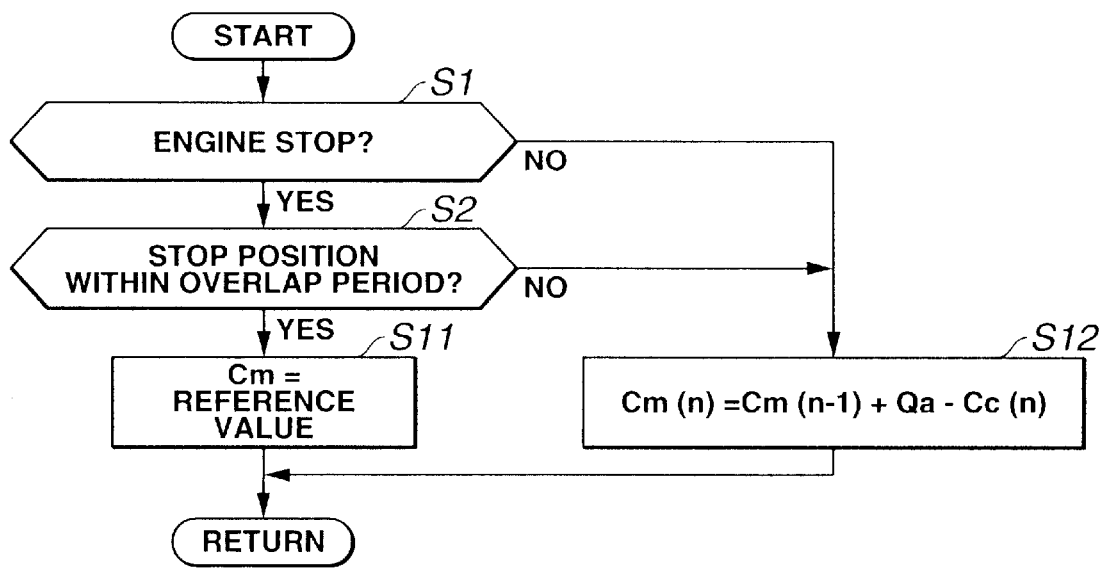
FIG. 6 is a flowchart showing an engine stopping process in another example of the embodiment.

FIG. 6 shows another example of the engine stop control process executed by engine controller 32 in place of FIG. 5. Steps S1 and S2 are substantially identical to S1 and S2 shown in FIG. 5, and repetitive explanation is omitted.

If engine 1 is stopped at a stop position within the valve overlap and the answers of both S1 and S2 are affirmative, then engine controller 32 proceeds to S11, substitutes a reference value into the manifold inside air quantity Cm as final value of the engine stopping process, and stores the thus-determined value of Cm. This reference value is a fixed value stored by engine controller 32. The reference value is set equal to an air quantity of air filled in intake manifold 101 when engine 1 is at a stop under an atmospheric condition in a normal running environment.

When engine 1 is not yet stopped (the pressure in intake manifold 101 does not become equal to the atmospheric pressure), or when engine 1 has stopped but its stop position is outside the valve overlap, then engine controller 32 proceeds from S1 or S2, to S12, and continues the balance calculation to determine manifold inside air quantity Cm.

FIG. 7 shows an overlap stop detecting routine (for setting the overlap stop flag fTOPJDC used at S2 of FIG. 5 or 6) employed in this embodiment.

At S21, engine controller 32 checks whether engine 1 has stopped. In this example, engine controller 32 determines engine speed NE from motor speed NM of motor/generator 8, and judges that engine 1 comes to a stop when the absolute value of the thus-determined engine speed NE becomes lower than or equal to a predetermined speed NESTP. From S21, engine controller 32 proceeds to S22 when engine 1 is in a stop state of NE≦NESTP, and to S25 when engine 1 is not in the stop state.

Figure 8:
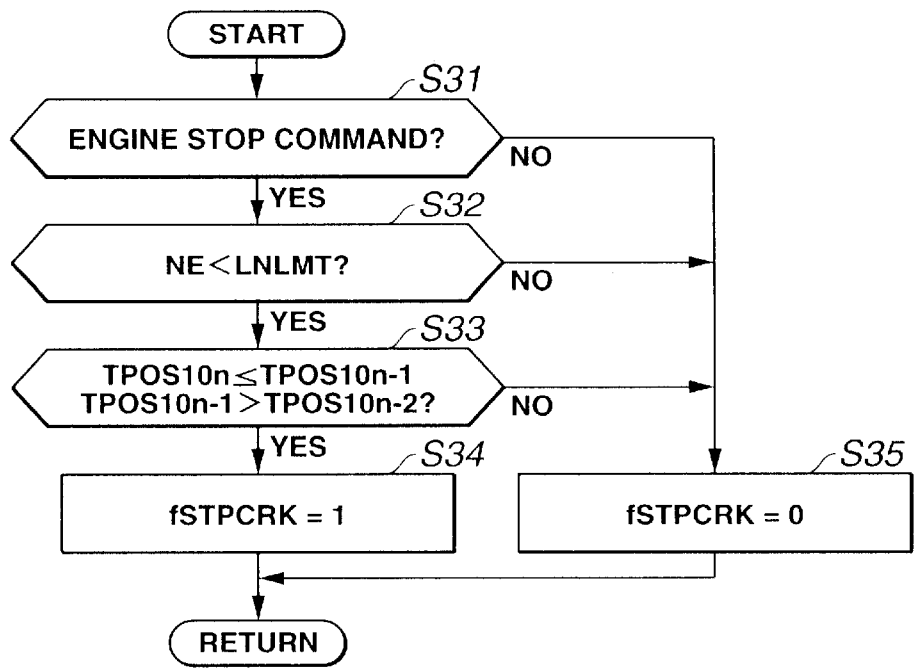
FIG. 8 is a flowchart showing a process of detecting a reverse rotation of an engine crank shaft in the embodiment.

At step S22, engine controller 32 checks whether engine 1 rotates in the reverse direction by a swing-back of the crank shaft (by checking a reverse rotation flag fSTPCRK set or reset by a reverse rotation checking routine shown in FIG. 8). When there is no reverse rotation of the crank shaft, then engine controller 32 proceeds to S23. When it is judged that there is a reverse rotation, then engine controller 32 proceeds from S22 directly to S25 to inhibit the operation of S23.

At S23, engine controller 32 determines whether the engine stop position (CRACNT) of engine 1 determined by the output signal of crank angle sensor 49 is within a valve overlap crank angle region (C1~C2) corresponding to the valve overlap period. When the engine stop position is within this overlap region (C1≦CRACNT≦C2), engine controller 32 proceeds to S24. Controller 32 proceeds to S25 when the engine stop position is outside the valve overlap region.

At S24, engine controller 32 sets the overlap stop flag fTOPJDC to one to indicate that engine 1 is stopped within the overlap period. At S25, on the other hand, overlap stop flag fTOPJDC is reset to zero when engine 1 is not yet in the stop state, or when there is a reverse crank shaft rotation or when the engine stop position is outside the overlap period though there is no reverse crank shaft rotation.

FIG. 8 shows a crank shaft reverse rotation detecting routine (for setting or resetting flag fSTPCRK read at S22 of FIG. 7) of this example.

At S31, engine controller 32 examines whether an engine stop command is issued or not. In this example, it is judged that there is an engine stop command when a low speed running operation by motor/generator 2 is selected, or when the engine torque command from vehicle ECU 21 becomes equal to or lower than zero, or when there is a fuel cutoff command. From S31, engine controller 32 proceeds to S32 in the case of the affirmative judgment that there is an engine stop command, and to S35 in the case of the negative judgment that there is no engine stop command.

At S32, engine controller 32 examines whether engine speed NE become lower than a predetermined speed value LNLMT. When engine speed NE decreases sufficiently and hence NE<LNLMT, then controller 32 proceeds to S33. Otherwise, controller 32 proceeds to S35.

At S33, controller 32 compares a current value $TPOS10_n$ of a pulse repetition interval (or period) in a unit angle pulse signal (pulse train) (a position signal POS1O) produced by crank angle sensor 49, with a previous value $TPOS10_{n-1}$ of the pulse repetition interval calculated in the preceding calculation cycle. In this example, crank angle sensor 49 produce a pulse of the unit angle pulse signal in each unit angular displacement of the engine crank shaft (the unit crank shaft angular displacement is equal to 1° in this example). From S33, controller 32 proceeds to S34 when the current value $TPOS10_n$ of the pulse repetition interval TPOS10 is smaller than or equal to the previous value $TPOS10_{n-1}$ ($TPOS10_n \leq TPOS10_{n-1}$); and to S35 when the current value $TPOS10_n$ of the pulse repetition interval TPOS10 is greater than the previous value $TPOS10_{n-1}$ ($TPOS10_n > TPOS10_{n-1}$).

In the example of FIG. 8, step S33 is arranged to further compare the first most recent previous value $TPOS10_{n-1}$ of the pulse repetition interval, with a second most recent previous value $TPOS10_{n-2}$ of the pulse repetition interval calculated in the cycle immediately before the preceding calculation cycle. From S33, controller 32 proceeds to S34 when the current pulse repetition interval value $TPOS10_n$ is smaller than or equal to the first most recent previous value $TPOS10_{n-1}$ ($TPOS10_n \leq TPOS10_{n-1}$), and at the same time the first most recent pulse repetition interval value $TPOS10_{n-1}$ is greater than the second most recent previous value $TPOS10_{n-2}$ ($TPOS10_{n-1} > TPOS10_{n-2}$). If at least one of the first condition of $TPOS10_n \leq TPOS10_{n-1}$ and the second condition of $TPOS10_{n-1} > TPOS10_{n-2}$ is not satisfied, then controller 32 proceeds to S35. By checking the first and second conditions, engine controller 32 can detect an inflection point of the pulse repetition time interval accurately.

It is optional to examine at S33, as a condition for the above-mentioned operation, whether the most recent previous value $TPOS10_{n-1}$ is longer than a threshold value TPOSLMT corresponding to a time required to go through the top dead center ($TPOS10_{n-1} > TPOSLMT$). Even when the crank shaft is rotating in the forward direction, the pulse repetition interval or period of the position signal is decreased by rotation fluctuation during passage through the top dead center. The interval tends to be longer in the case of a crank shaft reverse rotation than in the case of a passage through TDC because the reverse rotation starts after the crank shaft is brought to a stop once. Therefore, engine controller 32 can avoid misjudgment of reverse rotation due to a crossing of TDC by proceeding to S34 only when $TPOS10_{n-1}$ is longer than TPOSLMT; and proceeds to S35 otherwise. It is possible to detect the crossing of TDC by other means, for example, by sensing TDC on the basis of crank angular position CRACNT.

At S34, controller 32 sets the reverse rotation flag fSTPCRK to one to indicate the occurrence of a crank shaft reverse rotation. At S35, controller 32 resets reverse rotation flag fSTPCRK to zero when engine 1 is in operation, the engine speed is not yet decreased sufficiently in spite of an engine stop command, or the position pulse repetition interval TPOS10 is increasing.

Figure 9:
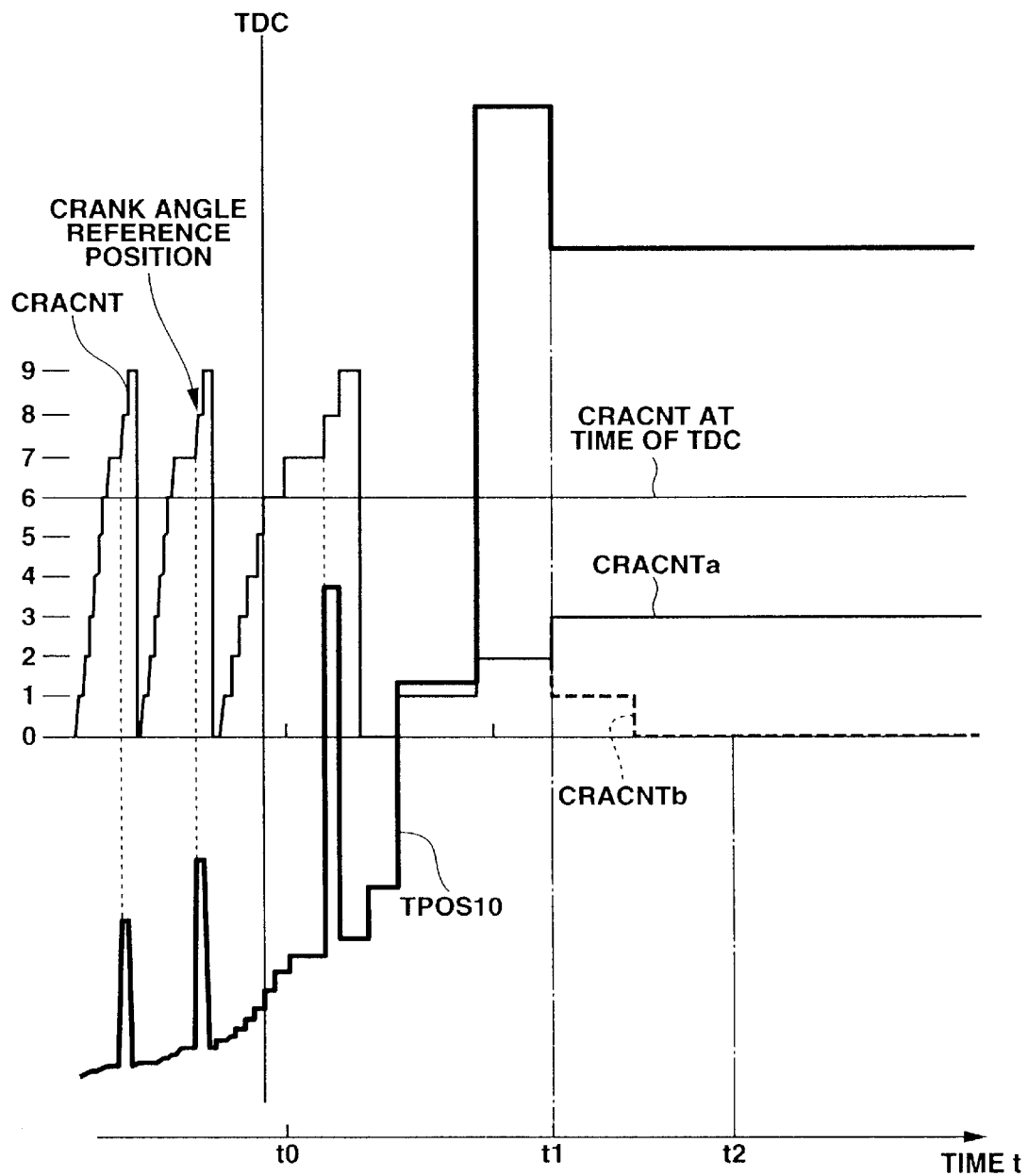
FIG. 9 is a graph illustrating changes in a crank angle position CRANCNT and a position pulse repetition interval TPOS1O used in the embodiment during an engine stopping operation.

FIG. 9 illustrates, in the form of a time chart, operations of the control (engine stopping process) performed by engine controller 32 as shown in the flowcharts of FIGS. 5~8. FIG. 9 shows time changes in the crank angle position CRACNT determined by counting pulses in position signal POS10 produced by crank angle sensor (of a wheel IC type, in this example) for each unit angular displacement, and the pulse repetition interval (or period) of the pulse train of POS signal POS10.

The position signal is produced by a position sensor for sensing the angular position of the crank shaft. A pulse is produced in each angular displacement through 10° of a signal plate attached to the crank shaft. This signal plate is formed with notches arranged at regular angular intervals of 120° in the case of a six-cylinder engine, for sensing a reference crank angle position. The crank angle position CRACNT is set to one of ten digits 0~9 in accordance with the reference crank angle position (in this example, CRACNT=8).

Position pulse repetition interval TPOS10 is calculated by measuring the interval of pulses of position signal POS10 with a timer. As crank angle sensor, there is further provided a phase sensor for producing a phase signal PHASE for cylinder discrimination, in addition to the position sensor.

In the example of FIG. 9, after generation of an engine stop command by vehicle ECU 21, engine speed NE becomes lower than predetermined speed value LNLMT at an instant t0. Normally, position pulse repetition interval TPOS10 is increased as engine speed NE decreases. Therefore, engine controller 32 can determine whether engine 1 is stopped within the overlap period, by examining whether the crank angle position CRACNT (=3 in the example of FIG. 9) at an instant t2 at which a time longer than a predetermined time has elapsed until a next input of the position signal POS10, and a judgment of an engine stop is made, is within the region corresponding to the overlap period.

If, on the other hand, the crank shaft is swung back, before the engine stoppage, by a compression reaction force of the in-cylinder gases or gravitational force, the crank shaft rotates in the reverse direction with temporary acceleration. Therefore, the position pulse repetition interval TPOS10 becomes shorter than the previous value (instant t1). Therefore, engine controller 32 can detect a reverse crank shaft rotation by examining the position pulse repetition interval POS10.

In general, crank angle position CRACNT is simply incremented, without regard to the rotational direction of the crank shaft, upon the occurrence of each pulse of position signal POS10. Accordingly, crank angle position CRACNT is incremented by the occurrence of a position pulse even if the crank shaft is rotated in the reverse direction. As a result, if there is a reverse crank shaft rotation, engine controller 32 cannot determine the engine stop position accurately. If the finally calculated CRACNT is within the overlap region, the actual stop position of the crank shaft is not within the overlap region. Engine controller 32 according to this embodiment inhibits the engine stop position judgment in this case, and thereby prevent a misjudgment that the engine is stopped within the overlap region.

The signal plate of crank angle sensor 49 of this example is formed with the notches arranged at regular intervals. Therefore, even though the crank shaft is rotating in the forward direction, the position pulse repetition interval TPOS10 calculated at the occurrence of a position pulse POS10 after the detection of one notch becomes shorter than the previous value. To prevent misjudgment of reverse rotation in this case, step S33 is arranged to transfer control forcibly to S35 when n=8.

When crank angle sensor 49 employs a signal plate having no notches, there is no need for providing such measures to avoid misjudgment. In this case, there is provided another means for detecting a reference crank angle position. In one example, the engine controller is configured to detect the top dead center in accordance with the cylinder discrimination signal PHASE and determine the reference crank angle position in accordance with the top dead center.

Engine controller 32 continues the balance calculation of the manifold inside air quantity Cm after engine 1 is stopped at a position outside the overlap period until the inside pressure in intake manifold 101 becomes equal to the level of the atmospheric pressure, and stores the final value obtained by the balance calculation, as the learning control quantity. At the time of a next engine start, engine controller 32 determines the cylinder induction air quantity Qc by using the stored value of Cm as an initial value.

When, on the other hand, engine 1 is stopped within the overlap period, engine controller 32 stops the balance calculation of manifold inside air quantity Cm. Instead, engine controller 32 stores, as the final value of manifold inside air quantity to be used as the initial value in a next engine start, the most recent value of the manifold inside air quantity (the learned value of the learning control quantity) calculated most recently when the engine is stopped outside the valve overlap period (in the case of S3 in FIG. 5); or the reference value of manifold inside air quantity Cm (in the case of S11 in FIG. 6).

Thus, the engine cylinder induction air quantity measuring apparatus is configured to calculate manifold inside air quantity Cm and to determine whether the engine stop position of engine 1 is within the valve overlap period of the engine. The engine cylinder induction air quantity measuring apparatus is further configured to set the manifold inside air quantity equal to an overlap stop mode final air quantity at step S3 or S11 when the engine stop position is within the valve overlap period. Therefore, in the operation of a next engine start after an engine stoppage within the overlap period, the cylinder induction air quantity measuring apparatus can use, as the initial value of manifold inside air quantity Cm, the learned value calculated before when engine 1 is stopped outside the valve overlap period (in the example of FIG. 5). Consequently, the cylinder induction air quantity measuring apparatus can restrain an increase of undesired emissions and insufficiency of torque in a next engine starting operation due to errors in manifold inside air quantity Cm caused by a reverse flow from the exhaust system during the valve overlap condition.

The cylinder induction air quantity measuring apparatus according to this embodiment is arranged to inhibit the engine stop position determination when the engine crank shaft is rotated in the reverse direction at the time of engine stoppage, and thereby to prevent misjudgment of an engine stoppage within the overlap period. This apparatus can detect a reverse crank shaft rotation readily by checking the.position pulse repetition interval. When the crank shaft is rotated in the reverse direction, the crank shaft is stopped at a position before the overlap period. Therefore, it is possible to reset flag fTOPJDC to zero when a reverse crank shaft rotation is detected.

In the above-mentioned example, an engine stop command is produced when the low speed running operation by motor/generator 2 is selected. However, an engine stop command is generated at various other timings according to the control system to which the present invention is applied, and the engine induction air quantity measuring apparatus according to the present invention can respond to these various engine stop commands. For example, it is possible to regard as an engine stop command, a turn-off of the ignition switch, or a decision of an idle stop (when, for example, an idle switch turns on and the vehicle speed at that time is equal to or lower than a predetermined speed value). The engine stop includes a temporary idle stop.

Figure 10:
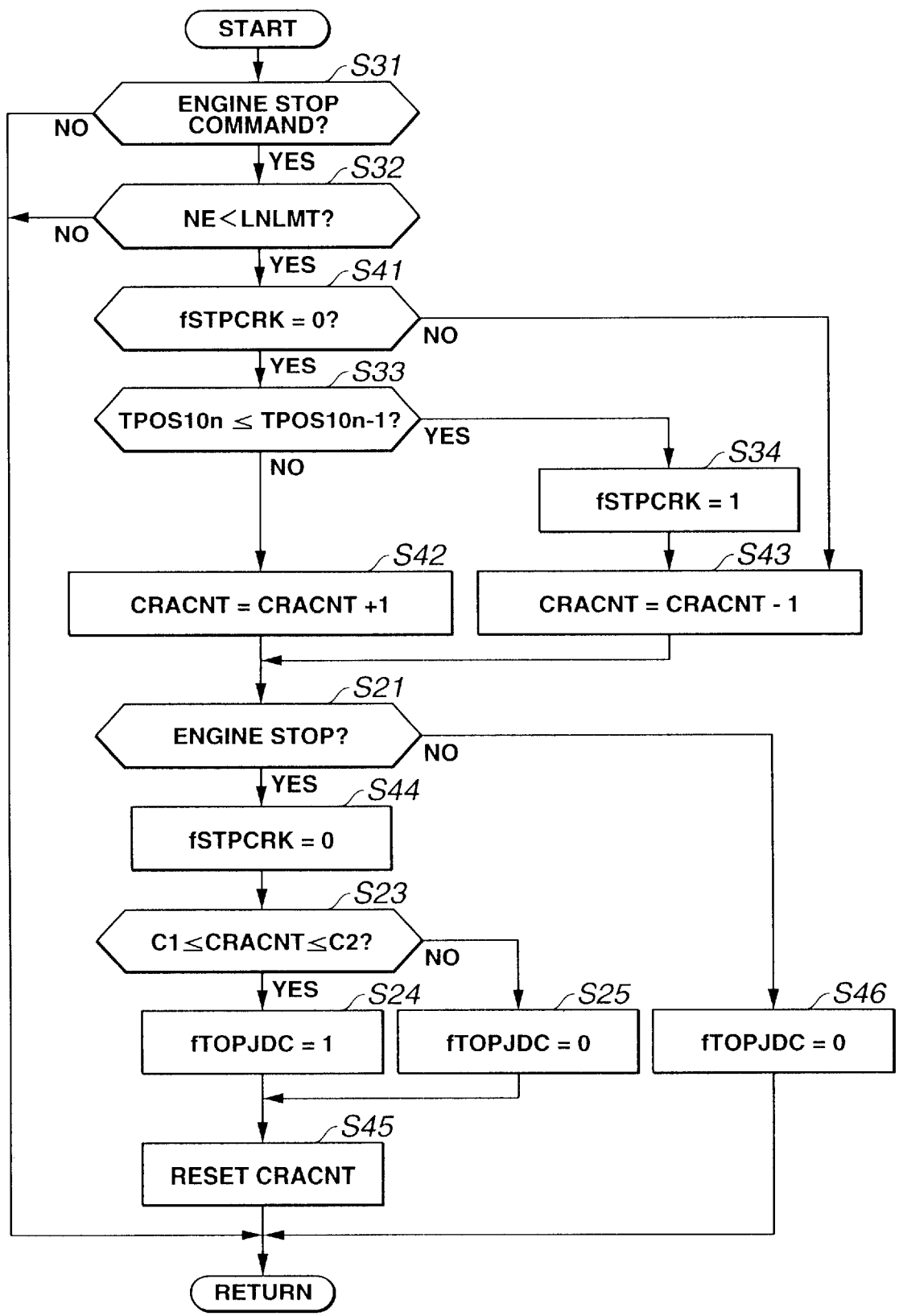
FIG. 10 is a flowchart showing an engine stopping process of another practical example of the present invention.

FIG. 10 shows an engine stopping control process in another practical example of the embodiment. Steps S21, S23, S24, S25, S31, S32, S33 and S34 in FIG. 10 are substantially identical to the corresponding steps in the preceding example shown in FIGS. 7 and 8.

At S41, engine controller 32 determines whether a reverse crank shaft rotation is caused or not. When engine 1 is still revolving at a relatively high speed and there is no swing back, engine controller 32 proceeds to S33. However, engine controller 32 proceeds to S43 after the crank shaft is swung back and flag fSTPCRK is set to one at S34.

At S33, engine controller 32 examines whether the current position pulse interval TPOS10 is increased as compared to the most recent previous value, and proceeds to S42 if it is. If the current value of the position pulse interval TPOS1O is equal to or shorter than the previous value, engine controller 32 proceeds from S33 to S34. At S34, flag fSTPCRK is set to one. After S34, engine controller 32 proceeds to S43.

At S42, controller 32 increments the crank angle position CRACNT by one since the crank shaft is revolving in the forward direction. At S43, on the other hand, controller 32 decrements crank angle position CRACNT by one so as to detect the crank angle accurately even in the case of a reverse rotation.

While the answer of step S21 is negative, indicating that engine 1 is not yet stopped, controller 32 proceeds from S21 (following S42 or S43) to S46, and resets the overlap stop flag (or engine stop position judgment flag) fTOPJDC to zero.

When the answer of S21 becomes affirmative to signal an engine stoppage, controller 32 proceeds to S44, and resets reverse rotation judgment flag fSTPCRK to zero.

When step S23 following S44 provides an affirmative answer indicating that the engine stop position is within the overlap period, then controller 32 proceeds from S23 to S24, and sets overlap stop flag fTOPJDC to one. After S24, controller 32 proceeds to S45. When the engine stop position is judged to be outside the overlap period, controller 32 proceeds from S23 to S25, resets overlap stop flag fTOPJDC to zero at S25, and then proceeds to S45. At S45, controller 32 resets crank angle position CRACNT to zero.

The thus-constructed engine cylinder induction air quantity measuring apparatus in the example of FIG. 10 is arranged to decrease the variable CRACNT representing the crank angle position (as shown by CRACNTb in FIG. 9) when the crank shaft rotates in the reverse direction before a stoppage. Therefore, the measuring apparatus can detect the engine stop position accurately.

Step S5 or S12 corresponds to means for calculating an intake manifold inside air quantity by calculating a balance between an intake manifold inflow air quantity which is the mass of air flowing into an intake manifold of an engine and which is determined from an air flow rate sensed on an upstream side of the intake manifold, and an intake manifold outflow air quantity which is the mass of air flowing out of the intake manifold into a cylinder section of the engine, and calculating a cylinder induction air quantity from the intake manifold inside air quantity. At least one of steps S1 and S21 corresponds to means for detecting an engine stop (inclusive of an idle stop). At least one of steps S2 and S23 corresponds to means for determining whether an engine stop position of the engine is within a valve overlap period of the engine. At least one of steps S3, S4 and S11 corresponds to means for modifying the manifold inside air quantity by setting the manifold inside air quantity equal to an overlap stop mode quantity when the engine stop position is within the valve overlap period.

This application is based on a prior Japanese Patent Application No. 2002-010666 filed in Japan on Jan. 18, 2002. The entire contents of the prior Japanese Patent Application No. 2002-010666 are hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. An engine cylinder induction air quantity measuring apparatus for an engine provided with a valve overlap period during which an intake valve and an exhaust valve both open, the engine cylinder induction air quantity measuring apparatus comprising:

an intake air quantity sensing section to sense an intake air quantity of air drawn into an intake system of the engine;

an intake manifold inside air quantity calculating section to calculate an intake manifold inside air quantity of air in an intake manifold of the engine, from the intake air quantity by performing a balance calculation to calculate a balance between an intake manifold inflow air quantity of air flowing into the intake manifold, and an intake manifold outflow air quantity of air flowing out of the intake manifold;

a cylinder induction air quantity calculating section to calculate a cylinder induction air quantity of air inducted into a cylinder section of the engine in accordance with the intake manifold inside air quantity;

an engine stop position determining section to detect an engine stop of the engine, and to determine whether an engine stop position of the engine is within the valve overlap period; and a manifold inside air quantity modifying section to set the intake manifold inside air quantity equal to an overlap stop mode final air quantity and thereby to cause the intake manifold air quantity calculating section to use the overlap stop mode final air quantity as an initial value of the intake manifold inside air quantity in a next start of the engine when the engine stop position is within the valve overlap period.

2. The engine cylinder induction air quantity measuring apparatus as claimed in claim 1, wherein the overlap stop mode final air quantity is a predetermined air quantity stored before the engine stop at the engine stop position within the valve overlap period.

3. The engine cylinder induction air quantity measuring apparatus as claimed in claim 1, wherein the manifold air quantity modifying section is configured to set the intake manifold inside air quantity to a normal mode final air quantity when the engine stop position is not within the overlap period, and to set the manifold inside air quantity to the overlap stop mode final air quantity determined so as to take account of air drawn from an exhaust system of the engine into the intake system when the engine stop position is within the overlap period.

4. The engine cylinder induction air quantity measuring apparatus as claimed in claim 3, wherein the intake manifold inside air quantity calculating section is configured to calculate the normal mode final air quantity by continuing the balance calculation after detection of an engine stop until a predetermined final condition is reached, and the manifold inside air quantity modifying section is configured to increase the intake manifold inside air quantity by setting the intake manifold inside air quantity to the overlap stop mode final air quantity instead of the normal mode final air quantity when the engine stop position is within the overlap period.

5. The engine cylinder induction air quantity measuring apparatus as claimed in claim 4, wherein the overlap stop mode final air quantity is greater than a final value of the intake manifold inside air quantity reached by the balance calculation when the balance calculation is continued until a pressure in the intake manifold becomes equal to an atmospheric pressure.

6. The engine cylinder induction air quantity calculating apparatus as claimed in claim 3, wherein the overlap stop mode final air quantity is set equal to the normal mode final air quantity calculated and stored when the engine is stopped outside the overlap period.

7. The engine cylinder induction air quantity measuring apparatus as claimed in claim 3, wherein the overlap stop mode quantity is set equal to an air quantity of air filled in the intake manifold when the engine is stopped under an atmospheric condition in a normal running situation.

8. The engine cylinder induction air quantity measuring apparatus as claimed in claim 3, wherein the overlap stop mode final air quantity is a fixed value.

9. The engine cylinder induction air quantity measuring apparatus as claimed in claim 1, wherein the engine cylinder induction air quantity measuring apparatus further comprises a crank position sensor to sense an angular position of a crank shaft of the engine; and the engine stop position determining section is configured to determine whether the engine stop position is within the valve overlap period, by examining the angular position sensed by the crank position sensor.

10. The engine cylinder induction air quantity measuring apparatus as claimed in claim 9, further comprising:

a crank angle calculating section to determine the angular position of the crank shaft by integrating an angular displacement of the crank shaft sensed by the crank position sensor;

a reverse rotation detecting section to detect a reverse rotation of the crank shaft by examining a signal produced by the crank position sensor; and an inhibiting section to inhibit the determination by the engine stop position determining section when the reverse rotation is detected.

11. The engine cylinder induction air quantity measuring apparatus as claimed in claim 10, wherein the crank angle calculating section is configured to examine a unit angular displacement time which is a time required for a unit angular displacement of the crank shaft, and to detect a reverse crank shaft rotation when the time unit angular displacement time stops increasing in a process of stopping the engine.

12. The engine cylinder induction air quantity measuring apparatus as claimed in claim 11, wherein the reverse rotation detecting section is configured to detect a reverse crank shaft rotation when first and second conditions are both met, the first condition being met when a current value TPOS10n of the unit angular displacement time is smaller than or equal to a first most recent previous value TPOS10n−1 of the unit angular displacement time, that is TPOS10n≦TPOS10n−1, and the second condition being met when the first most recent previous value TPOS10n−1 is greater than a second most recent previous value TPOS10n−2 of the unit angular displacement time, that is TPOS10n−1>TPOS10n−2.

13. The engine cylinder induction air quantity measuring apparatus as claimed in claim 11, wherein the reverse rotation detecting section is configured to detect a reverse crank shaft rotation only when a previous value of the unit angular displacement time is longer than a predetermined threshold time length.

14. An engine cylinder induction air quantity measuring process comprising:

calculating an intake manifold inside air quantity, from a sensed intake air quantity of an engine, by performing a balance calculation to calculate a balance between an intake manifold inflow air quantity, and an intake manifold outflow air quantity, and calculating a cylinder induction air quantity from the intake manifold inside air quantity;

determining whether an engine stop position of the engine is within a valve overlap period of the engine; and modifying the manifold inside air quantity by setting the manifold inside air quantity equal to an overlap stop mode final air quantity when the engine stop position is within the valve overlap period.

15. An engine cylinder induction air quantity measuring apparatus comprising:

means for calculating an intake manifold inside air quantity by calculating a balance between an intake manifold inflow air quantity which is the mass of air flowing into an intake manifold of an engine and which is determined from an air flow rate sensed on an upstream side of the intake manifold, and an intake manifold outflow air quantity which is the mass of air flowing out of the intake manifold into a cylinder section of the engine, and calculating a cylinder induction air quantity from the intake manifold inside air quantity;

means for detecting an engine stop of the engine;

means for determining whether an engine stop position of the engine is within a valve overlap period of the engine when the engine stop is detected; and means for modifying the manifold inside air quantity by setting the manifold inside air quantity equal to an overlap stop mode quantity when the engine stop position is within the valve overlap period.

* * * * *